United States Patent
Do

(10) Patent No.: US 9,061,731 B1
(45) Date of Patent: Jun. 23, 2015

(54) SELF-CHARGING ELECTRIC BICYCLE

(71) Applicant: Hung Do, Las Vegas, NV (US)

(72) Inventor: Hung Do, Las Vegas, NV (US)

(*) Notice: Subject to any disclaimer, the term of this patent is extended or adjusted under 35 U.S.C. 154(b) by 344 days.

(21) Appl. No.: 13/651,678

(22) Filed: Oct. 15, 2012

(51) Int. Cl.
*B62M 6/40* (2010.01)
*B62M 6/80* (2010.01)
*B62M 6/90* (2010.01)
*B62M 6/50* (2010.01)
*B62M 6/85* (2010.01)

(52) U.S. Cl.
CPC . *B62M 6/40* (2013.01); *B62M 6/90* (2013.01); *B62K 2204/00* (2013.01); *B62M 6/80* (2013.01); *B62M 6/50* (2013.01); *B62M 6/85* (2013.01)

(58) Field of Classification Search
None
See application file for complete search history.

(56) References Cited

U.S. PATENT DOCUMENTS

| | | | |
|---|---|---|---|
| 6,155,369 A | 12/2000 | Whittaker | |
| 6,486,582 B1* | 11/2002 | Patarchi | 310/12.12 |
| 6,717,280 B1 | 4/2004 | Bienville | |
| 6,765,362 B2 | 7/2004 | Ta-Shuo | |
| 7,015,598 B2* | 3/2006 | Oohara | 307/47 |
| 2007/0035134 A1* | 2/2007 | Bristow, Jr. | 290/1 R |
| 2010/0270810 A1* | 10/2010 | Liebermann | 290/1 A |
| 2014/0035356 A1* | 2/2014 | Watarai et al. | 307/9.1 |

* cited by examiner

*Primary Examiner* — Leigh Garbowski
(74) *Attorney, Agent, or Firm* — Crossley Patent Law

(57) ABSTRACT

A self-charging electric bicycle that includes a solar panel disposed upon a back plate above the rear wheel, a first dynamo operationally engaged by the rotational force of the front wheel, a second dynamo operationally engaged by the rotational force of the rear wheel, and a third dynamo operationally engaged at a high gear ratio by a second chain in operational communication with the bicycle pedal crank, wherein an electric battery disposed within a housing upon the bicycle frame is charged and recharged when the bicycle is moved and pedaled and when sunlight is incident the solar panel, whereby an electric motor is activatable to drive the bicycle, as desired.

6 Claims, 3 Drawing Sheets

SELF-CHARGING ELECTRIC BICYCLE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of electric bicycles are known in the prior art. However, what is needed is a self-charging electric bicycle that includes a solar panel disposed upon a back plate above the rear wheel, a first dynamo operationally engaged by the rotational force of the front wheel, a second dynamo operationally engaged by the rotational force of the rear wheel, and a third dynamo operationally engaged at a high gear ratio by a second chain in operational communication with the bicycle pedal crank, wherein an electric battery disposed within a housing upon the bicycle frame is charged and recharged when the bicycle is moved and pedaled and when sunlight is incident the solar panel, whereby an electric motor is activatable to drive the bicycle, as desired.

FIELD OF THE INVENTION

The present invention relates to a self-charging electric bicycle, and more particularly, to a self-charging electric bicycle that includes a solar panel disposed upon a back plate above the rear wheel, a first dynamo operationally engaged by the rotational force of the front wheel, a second dynamo operationally engaged by the rotational force of the rear wheel, and a third dynamo operationally engaged at a high gear ratio by a second chain in operational communication with the bicycle pedal crank, wherein an electric battery disposed within a housing upon the bicycle frame is charged and recharged when the bicycle is moved and pedaled and when sunlight is incident the solar panel, whereby an electric motor is activatable to drive the bicycle, as desired.

SUMMARY OF THE INVENTION

The general purpose of the self-charging electric bicycle, described subsequently in greater detail, is to provide a self-charging electric bicycle which has many novel features that result in a self-charging electric bicycle which is not anticipated, rendered obvious, suggested, or even implied by prior art, either alone or in combination thereof.

In a world beset by the fears of a changing climate people are increasingly demanding more alternative means of transportation independent of fossil fuels. Furthermore, as city centers continue to increase in population density, more and more people are opting to travel by bicycle to navigate through urban congestion unimpeded. Wherefore the present invention has been devised to equip a bicycle with means for generating electricity to charge a battery to power an electric motor wherein a cyclist is enabled to pedal the bicycle or engage the electric motor and travel farther without the need of actively pedaling the bicycle.

The present self-charging electric bicycle combines a plurality of electricity generating means to charge and recharge a battery disposed upon the bicycle frame within a housing disposed around the bicycle frame. The battery is in circuit with an electric motor configured to drive the rear wheel of the bicycle when a switch is activated. The battery is in circuit with a solar panel disposed upon a back plate disposed over the rear wheel in a plane generally parallel with the ground. Thusly, when sunlight is incident the solar panel an electric current is generated, which electric current is transmitted to the battery to charge and recharge said battery, as needed.

The battery is also in circuit with a first dynamo disposed within the housing upon the front fork of the bicycle, said first dynamo proximal the front wheel of the bicycle. The first dynamo is engaged by the front wheel when the front wheel rotates, and an electric current is therefore generated at the first dynamo when the front wheel is rotated and the first dynamo is engaged. The first dynamo thusly charges and recharges the battery when the bicycle is moved.

A second dynamo is disposed in the housing proximal the rear wheel of the bicycle. The second dynamo is engaged by the rear wheel when the rear wheel rotates. Mechanical motion is thusly likewise transformed into electrical energy at the second dynamo, and an electric current produced at the second dynamo is likewise transmitted to charge and recharge the battery, as needed.

A third dynamo is disposed in the housing proximal to the pedal crank. A second chain is disposed from the pedal crank to rotationally engage the third dynamo as the pedal crank is turned. The gear ratio between the third dynamo and the pedal crank is such that the third dynamo is rotated at a greater frequency and angular velocity than the rotation of the pedal crank. Thusly, whenever the pedal crank is rotated, as when the bicycle is pedaled in the typical fashion, mechanical energy is transformed into electrical energy at the third dynamo and an electric current generated at the third dynamo is transmitted to charge and recharge the battery.

A copper coil and magnetic generator is also considered as part of the present device. The copper coil and magnetic generator is disposed upon the front wheel, wherein the rotational energy of the front wheel drives the magnetic field during the rotation of the magnet through the copper coil and electricity is generated thereby directly from the rotational movement of the front wheel. An example includes a magnet disposed upon the rim of the front wheel and a copper coil disposed in the front fork of the bicycle wherein the rotation of the wheel rim moves magnetic field through the copper coil upon the front fork to generate an electric current in the coil and transmitted to wires connected to the coil in circuit with the battery.

Thusly, when the bicycle is placed in the sunlight, sunlight incident the solar panel disposed upon the back plate generates electricity to charge and recharge the battery. When the bicycle is moving with the wheels on the ground, irrespective of the movement of the pedals, electricity is generated by the first and second dynamos wherein mechanical energy is transformed from the rotational force of front and rear wheels respectively into electrical energy at the respective first and second dynamos. And when the pedals are used and the pedal crank rotated, in the fashion typical of riding a bicycle, the second chain at a high gear ratio engages the third dynamo to generate more electricity at the third dynamo.

A switch disposed on the handle bars is manually operable to activate and deactivate the electric motor, as desired, wherein the electric motor engages the rear wheel and drives the bicycle without a user having to pedal the bicycle. A throttle control is also disposed upon the handle bars whereby the speed of the motor is controllable and the self-charging electric bicycle may be accelerated or decelerated as desired.

Thus has been broadly outlined the more important features of the present self-charging electric bicycle so that the detailed description thereof that follows may be better understood and in order that the present contribution to the art may be better appreciated.

Objects of the present self-charging electric bicycle, along with various novel features that characterize the invention are particularly pointed out in the claims forming a part of this disclosure. For better understanding of the self-charging electric bicycle, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
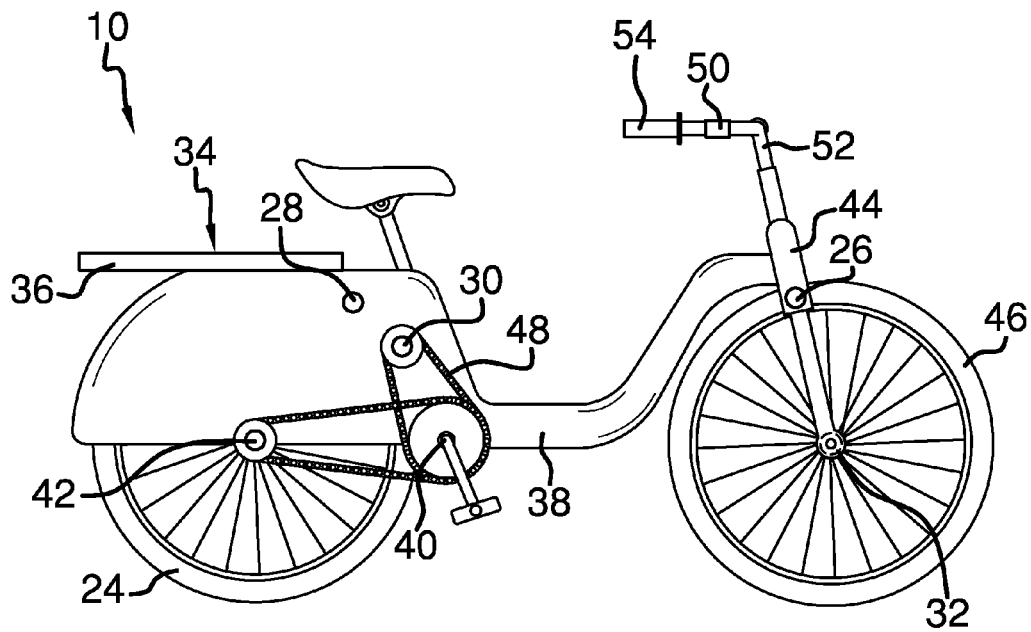
FIG. 1 is a side view.
Figure 2:
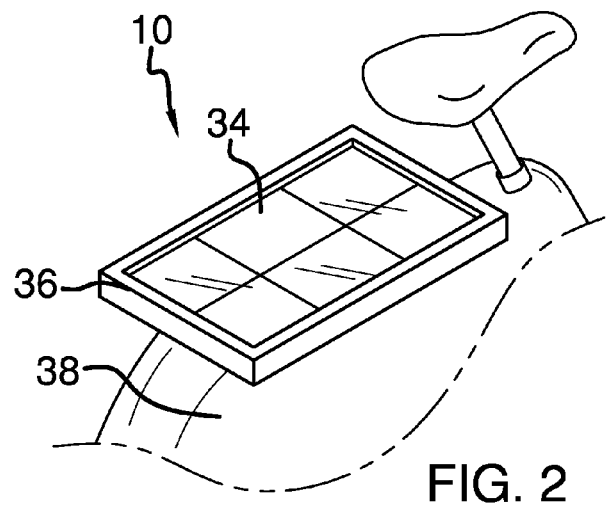
FIG. 2 is a detail view of a solar panel disposed upon a back plate.
Figure 3:
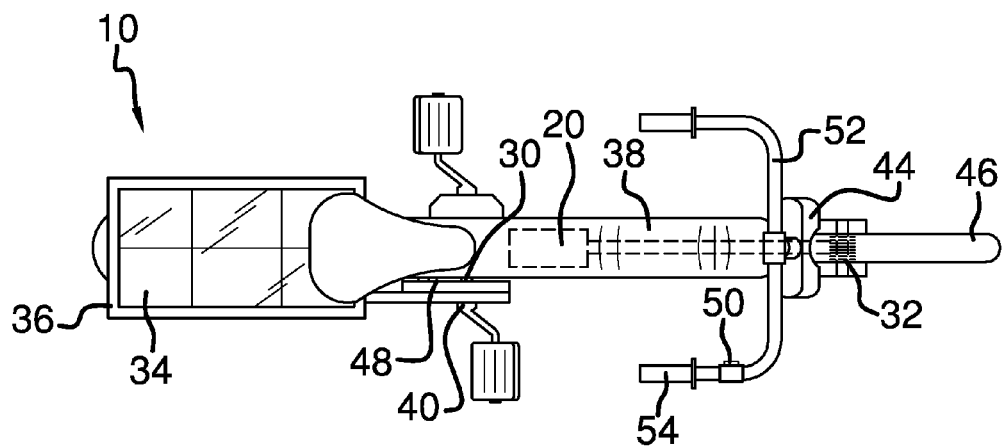
FIG. 3 is a top view.
Figure 4:
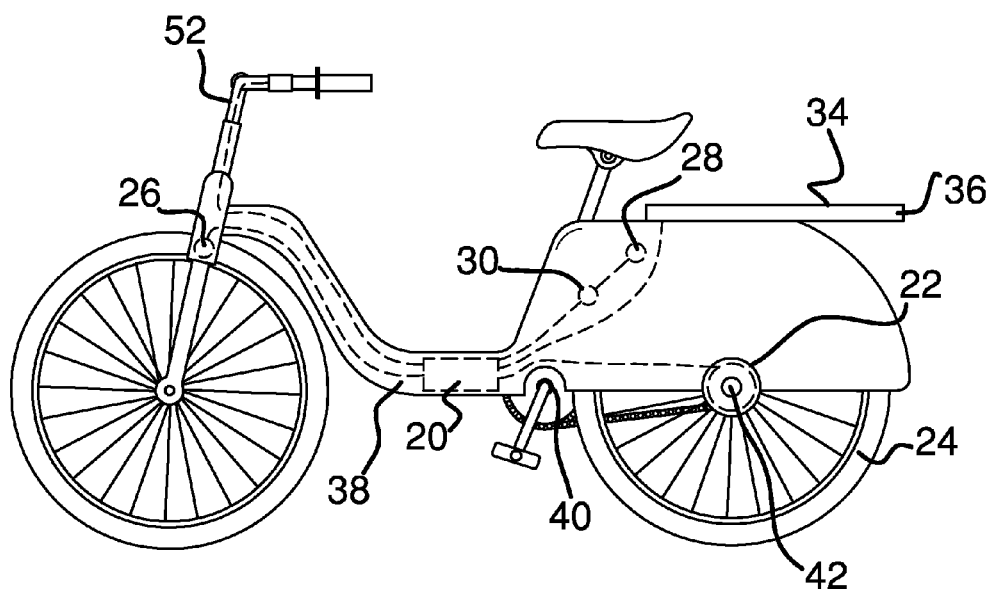
FIG. 4 is a side view.
Figure 5:
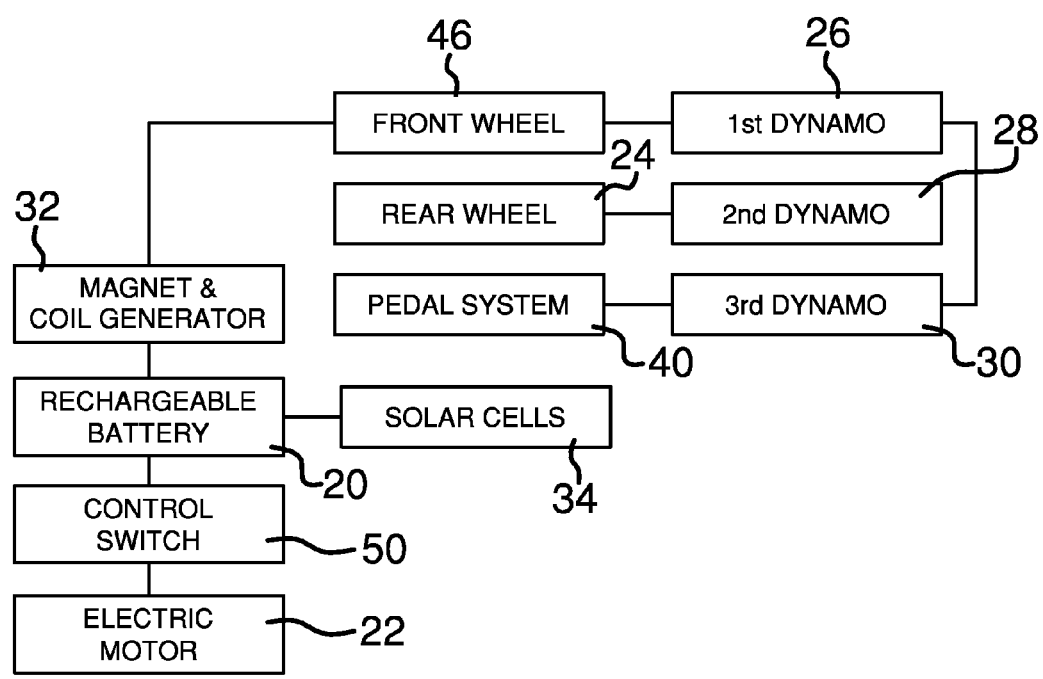
FIG. 5 is a schematic diagram.

With reference now to the drawings, and in particular FIGS. 1 through 5 thereof, example of the instant self-charging electric bicycle employing the principles and concepts of the present self-charging electric bicycle and generally designated by the reference number 10 will be described.

Referring to FIGS. 1 through 5 a preferred embodiment of the present self-charging electric bicycle 10 is illustrated.

The present self-charging bicycle 10 has been devised with a plurality of electricity generating means whereby an electric battery 20 in circuit with an electric motor 22 disposed to drive the rear wheel 24 of the bicycle 10 is continually charged when the bicycle 10 is moving or placed in the sun. The preferred embodiment of the present self-charging bicycle 10 includes a first dynamo 26, a second dynamo 28, a third dynamo 30, a copper coil and magnet generator 32, and a solar panel 34, all of which produce an electric current usable to charge and recharge the electric battery 20.

The self-charging electric bicycle 10 includes a back plate 36 disposed overlying the rear wheel 24 in a plane generally parallel with the ground. The solar panel 34 is disposed upon the back plate 36 to generate an electric current whenever sunlight is incident the solar panel 34.

A housing 38 is disposed around the bicycle 10 frame. The battery 20 is disposed within the housing 38 proximal to the pedal crank 40. The electric motor 22 is also disposed within the housing 38, said motor 22 in mechanical communication with the bicycle 10 pedal crank 40 and alternately the rear wheel 24 directly at the hub 42 (see FIG. 4).

The first dynamo 26 is disposed within the housing 38 proximal the front fork 44, said first dynamo 26 in operational communication with the bicycle 10 front wheel 46. When the front wheel 46 rotates, therefore, the first dynamo 26 is engaged and an electric current is generated at the first dynamo 26. The second dynamo 28 is disposed within the housing 38 proximal the rear wheel 24, said second dynamo 28 in operational communication with the rear wheel 24. When the rear wheel 24 rotates the second dynamo 28 is engaged and an electric current is generated at the second dynamo 28. The third dynamo 30 is disposed proximal the pedal crank 40, the third dynamo 30 in operational communication with the pedal crank 40.

A second chain 48 is disposed upon the pedal crank 40 to operationally engage the third dynamo 30 at a higher gear ratio. When the pedal crank 40 is turned, as when pedaling the bicycle 10 in the typical fashion, the second chain 48 rotationally engages with the third dynamo 30 and an electric current is generated at the third dynamo 30.

The solar panel 34 enables constant charging of the battery 20 when sunlight is incident the solar panel 34. The solar panel 34, first dynamo 26, second dynamo 28, and third dynamo 30, are in circuit with the battery 20 and the electric motor 22. The bicycle 10, therefore, need not be moving to generate electricity to charge the battery 20. However, when the bicycle 10 is moving, each of the first dynamo 26 and second dynamo 28, rotationally engaged by each of the front wheel 46 and the rear wheel 24 respectively, generate electricity. When the pedal crank 40 is turned by the action of pedaling the bicycle 10 the third dynamo 30 is engaged to generate electricity also. Thusly, the solar panel 36, the first dynamo 26, the second dynamo 28, and the third dynamo 30 are all usable to create an electric current which trickle charges the battery 20 whereby the electric motor 22 is usable to drive the bicycle 10, as desired.

A switch 50 is disposed upon the handle bars 52, said switch 50 disposed to alternately activate and deactivate the electric motor 22 when said switch 50 is moved between a first position and a second position.

A throttle control 54 is disposed upon the handle bars 52 wherein the speed of the motor 22 is controllable between a minimum speed and a maximum speed. The battery 20 is therefore recharged when the bicycle 10 is pedaled, when each of the front 46 and rear 24 wheels are rotated, and when the sun shines upon the solar panel 34 disposed on the back plate 36, whereby the electric motor 22 is powered to drive the bicycle 10 when activated.

The front wheel 46 may further comprise a copper coil and a magnet generator 32 whereby rotation of the wheel 46 generates a voltage as the magnet, rotated by the wheel 46, is rotated through the copper coil.

What is claimed is:
1. A self-charging electric bicycle comprising:
a back plate disposed overlying the rear wheel;
a solar panel disposed upon the back plate;
a housing disposed around the frame;
a battery disposed within the housing;
an electric motor disposed within the housing, said motor in mechanical communication with the rear wheel;
a first dynamo disposed within the housing proximal the front fork, said first dynamo in operational communication with the front wheel;
a second dynamo disposed within the housing proximal the rear wheel, said second dynamo in operational communication with the rear wheel;
a third dynamo disposed proximal the pedal crank; and
a second chain disposed upon the pedal crank, said second chain in operational communication with the third dynamo at a high gear ratio;
wherein the battery is recharged when the bicycle is pedaled, when each of the front and rear wheels are rotated, and when the sun shines upon the solar panel, whereby the electric motor is powered to drive the bicycle when activated.
2. The self-charging electric bicycle of claim 1 further comprising a switch disposed upon the handlebars wherein said switch alternately activates and deactivates the electric motor when said switch is moved between a first position and a second position.

3. The self-charging electric bicycle of claim 2 further comprising a throttle control disposed upon the handlebars wherein the speed of the motor is controllable between a minimum speed and a maximum speed.

4. The self-charging electric bicycle of claim 3 wherein further comprising a copper coil and magnet generator wherein movement of the front wheel through the front fork generates a voltage.

5. A self-charging electric bicycle comprising:
- a back plate disposed overlying the rear wheel;
- a solar panel disposed upon the back plate;
- a housing disposed around the frame;
- a battery disposed within the housing;
- an electric motor disposed within the housing, said motor in mechanical communication with the rear wheel;
- a first dynamo disposed within the housing proximal the front fork, said first dynamo in operational communication with the front wheel;
- a second dynamo disposed within the housing proximal the rear wheel, said second dynamo in operational communication with the rear wheel;
- a third dynamo disposed proximal the pedal crank;
- a second chain disposed upon the pedal crank, said second chain in operational communication with the third dynamo at a high gear ratio;
- a switch disposed upon the handle bars wherein said switch alternately activates and deactivates the electric motor when said switch is moved between a first position and a second position; and
- a throttle control disposed upon the handle bars wherein the speed of the motor is controllable between a minimum speed and a maximum speed;

wherein the battery is recharged when the bicycle is pedaled, when each of the front and rear wheels are rotated, and when the sun shines upon the solar panel, whereby the electric motor is powered to drive the bicycle when activated.

6. The self-charging electric bicycle of claim 5 further comprising a copper coil and magnet generator whereby rotation of the front wheel through the front fork generates a voltage.

\* \* \* \* \*